(12) United States Patent
Wollenburg

(10) Patent No.: US 11,685,075 B2
(45) Date of Patent: Jun. 27, 2023

(54) METHOD AND APPARATUS FOR FLATTENING WIDE BOARDS

(71) Applicant: Woodpeckers, LLC, Strongville, OH (US)

(72) Inventor: Benjamin T. Wollenburg, North Olmsted, OH (US)

(73) Assignee: WOODPECKERS, LLC, Strongsville, OH (US)

( * ) Notice: Subject to any disclaimer, the term of this patent is extended or adjusted under 35 U.S.C. 154(b) by 935 days.

(21) Appl. No.: 16/520,587

(22) Filed: Jul. 24, 2019

(65) Prior Publication Data
US 2021/0023735 A1    Jan. 28, 2021

(51) Int. Cl.
*B27C 1/14*    (2006.01)
*B23Q 11/00*    (2006.01)
*B27C 5/10*    (2006.01)

(52) U.S. Cl.
CPC ............ *B27C 1/14* (2013.01); *B23Q 11/0046* (2013.01); *B27C 5/10* (2013.01)

(58) Field of Classification Search
CPC .. B27C 1/00; B27C 1/005; B27C 1/14; B27C 5/10; B27F 1/02; B27F 1/04; B27F 1/08; B27F 1/10; B27F 1/12; B27F 1/14; B27F 1/16; B27F 5/02; B23Q 9/0007; B23Q 9/0014; B23Q 9/0028; B23Q 9/0042; B23Q 9/0064; B23Q 9/0071; B23Q 9/0078; B23Q 9/02; B23D 1/003; B23D 1/006; B23D 1/08; B23D 1/14; B23D 1/16; B23D 1/18; B23D 1/20; B23D 1/26; B23D 9/00; B23D 11/00; B23D 13/00; B23D 13/005; B23D 13/04
See application file for complete search history.

(56) References Cited

U.S. PATENT DOCUMENTS

| 3,706,169 A | 12/1972 | Rensch |
| 3,827,468 A * | 8/1974 | Markham ............ B23Q 9/0085 144/136.1 |
| 3,989,399 A | 11/1976 | Slowbe |

(Continued)

FOREIGN PATENT DOCUMENTS

| DE | 3716057 A1 * | 8/1988 | |
| GB | 2526361 A * | 11/2015 | ............. B27C 5/003 |

OTHER PUBLICATIONS

Ask Wood Man, '1001. Attach UHMW Tape to Your Guide Rail—Slick!', Jul. 16, 2016, https://www.youtube.com/watch?v=ntul1AOKs6s (Year: 2016).*

(Continued)

*Primary Examiner* — Shelley M Self
*Assistant Examiner* — Jared O Brown
(74) *Attorney, Agent, or Firm* — Sand, Sebolt & Wernow Co., LPA

(57) ABSTRACT

The present disclosure provides an apparatus, method and kit to flatten wide boards with an apparatus. The apparatus comprises two sets of rails, one set spanning laterally and the second set spanning longitudinally. The second set of rails is operative to move along the first set of rails by use of short members attached to the second set that interface with the first set of rails. Then, a carriage is operative to sit on top of the second set of rails and move along them. This is done by the carriage arms engaged on the second set of rails.

16 Claims, 5 Drawing Sheets

(56) References Cited

U.S. PATENT DOCUMENTS

| | | | |
|---|---|---|---|
| 4,035,977 A | | 7/1977 | Fischer |
| 4,215,731 A | * | 8/1980 | Maynard ............... B23Q 9/0078 |
| | | | 144/136.95 |
| D269,910 S | | 7/1983 | Johansson |
| D275,324 S | | 8/1984 | Wahlin |
| 4,735,531 A | * | 4/1988 | Boerckel ............ B23Q 11/0046 |
| | | | 144/136.95 |
| RE33,045 E | | 9/1989 | Gronholz et al. |
| D310,376 S | | 9/1990 | Johnsen |
| 5,031,678 A | * | 7/1991 | Remmele ........... B23Q 11/0046 |
| | | | 409/137 |
| D321,914 S | | 11/1991 | Tam |
| D322,133 S | | 12/1991 | Comeau et al. |
| D327,332 S | | 6/1992 | Clark |
| D344,347 S | | 2/1994 | Wittman |
| D344,356 S | | 2/1994 | Clark |
| D348,939 S | | 7/1994 | Larsson et al. |
| D355,825 S | | 2/1995 | Moyer |
| 5,392,583 A | | 2/1995 | Gregory |
| 5,456,559 A | | 10/1995 | Taylor |
| 5,562,136 A | * | 10/1996 | Blackshear .......... B23Q 9/0071 |
| | | | 144/144.1 |
| D418,231 S | | 12/1999 | DiGiorgio |
| 6,805,185 B2 | | 10/2004 | Gravel et al. |
| D501,564 S | | 2/2005 | Kuramochi |
| D526,068 S | | 8/2006 | Schlangen et al. |
| D552,325 S | | 10/2007 | Dickner |
| D563,124 S | | 3/2008 | Walter |
| D566,855 S | | 4/2008 | Bunner et al. |
| 7,383,670 B1 | | 6/2008 | Meyers |
| D577,445 S | | 9/2008 | Durrant |
| 7,469,485 B1 | | 12/2008 | Perdue |
| D634,858 S | | 3/2011 | Landau et al. |
| D643,545 S | | 8/2011 | McDonald et al. |
| D649,263 S | | 11/2011 | Brabeck et al. |
| 8,176,695 B2 | | 5/2012 | Deweerd et al. |
| D664,669 S | | 7/2012 | Schoonover et al. |
| D681,851 S | | 5/2013 | Zideck et al. |
| D692,593 S | | 10/2013 | Hanser et al. |
| D737,470 S | | 8/2015 | Bucarizza |
| D737,471 S | | 8/2015 | Bucarizza |
| D737,472 S | | 8/2015 | Bucarizza |
| D745,904 S | | 12/2015 | Geltinger et al. |
| D751,789 S | | 3/2016 | Cote et al. |
| D796,774 S | | 9/2017 | Simmons et al. |
| D803,419 S | | 11/2017 | Faibish et al. |
| D832,465 S | | 10/2018 | Hilliaho |
| D882,824 S | | 4/2020 | Hanlon |
| D899,629 S | | 10/2020 | Hanlon |
| D901,718 S | | 11/2020 | Schoonover et al. |
| 11,084,137 B1 | * | 8/2021 | Henry ....................... B27C 5/10 |
| 2012/0296463 A1 | * | 11/2012 | Rivers ................. B23Q 9/0042 |
| | | | 700/114 |
| 2014/0216228 A1 | * | 8/2014 | Zeiler .................... B23D 47/08 |
| | | | 83/483 |
| 2018/0050430 A1 | * | 2/2018 | Ashworth ............. B23Q 1/621 |
| 2019/0061008 A1 | * | 2/2019 | Akiyama ................. B23B 5/08 |

OTHER PUBLICATIONS

Summit Machine Tool, 'The Role of Manual Mills in a CNC World', Oct. 15, 2021, https://summitmt.com/the-role-of-manual-mills-in-a-cnc-world/ (Year: 2021).*

Curbell Plastics, 'UHMW vs. PTFE', 2022, https://www.curbellplastics.com/Research-Solutions/Plastic-Properties/UHMW-vs-PTFE (Year: 2022).*

* cited by examiner

METHOD AND APPARATUS FOR FLATTENING WIDE BOARDS

TECHNICAL FIELD

The present disclosure relates generally to the field of a woodworking device to flatten wide boards. More particularly, the present disclosure relates to a power tool guide system with a first set of tracks to guide the tool. Specifically, the present disclosure relates to a router guide system with a first set of tracks to guide the router and a second set of tracks used to guide the first set of tracks.

BACKGROUND

Background Information

Wood slabs can make great furniture and statement pieces in a home or office. At times, a wood slab may either be cut length wise or width wise with respect to a tree in order to expose a live edge. Live edge or natural edge is a style of furniture where the furniture designer or craftsperson incorporates a natural edge of the wood into the design of the piece. Traditionally this is done by leaving the outer layer of the bark or shape of the wood intact so that one may appreciate the beauty of the tree from which it came.

It is common for live edge furniture to incorporates lower grade wood, or wood that is not able to be used in other traditional woodworking applications. This may include Alligator Juniper, mesquite, drift wood of various varieties, reclaimed wood that has been previously treated as well as other salvaged wood. Some artisans prefer to leave the natural holes within the wood as well as the cracks in the wood while other artists fill them with resins. There are special challenges involved in working with these types of wood, and several methods for live edge have developed.

Nevertheless, in many cases, no matter in what way the initial wood is cut, it is generally a bit ragged and potentially splinter-filled. In order to prepare the wood for a table top or other surface, a lengthy sanding process may be implored to even the slab up so that the table sits level and is substantially free of any sharp edges. However, one must be very careful doing this as there is a risk of disturbing the natural bark finish, and a danger in removing sharp spots and other splinters to the sander themselves. Many of the most aesthetically pleasing slabs may be too large to go through a traditional planer or sander, and end grain slabs with a live edge should not go through a planer as it may distort the desired live edge.

Routers are used frequently in the woodworking trades to make straight cuts along a piece of wood, such as a wood slab. By allowing a router to be movable, it turns into an exceedingly powerful tool capable of making precise edges, flat surfaces, decorative designs, dadoes, and grooves. Powered hand held routers have become a common woodworking tool used by both professionals and hobbyists alike.

However, a powered router is difficult to keep in a straight line and to precisely control when cutting gnarled or other non-straight wood. Time is often spent making customized guides or patterns for specific router cutting operations. These custom guides then need to be attached to the wood by several separate clamping means.

Several devices exist within the art to help guide a router. However, these devices generally consist of a table with a router and guidance system for the router. The table is attached to at least two sides of the wood and a rudimentary track system generally runs over the wood allowing the router to be slideably attached to the track system which allows the router to slides over and cuts the top surface of the wood.

These devices are often bulky. As such, these devices are generally found only in dedicated woodworking shops, and are often quite expensive and consequently cost prohibitive for an individual, or a hobbyist who does not utilize the device frequently. Additionally, these devices are also limited by their size to the size of the wood on which they can be utilized.

However, these devices all are time consuming to operate and set up, generally expensive, involve copious physical exertion to set up and tear down, are unreliable, and are prone to slipping or causing injuries. Countless damage is caused every year by power tool accidents.

SUMMARY

In one aspect, the present disclosure may provide for an apparatus for altering boards comprising a first set of rails extending in a first direction, a second set of rails carried by the first set of rails that are perpendicular to the first set of rails extending in a second direction, a carriage carried by the second set of rails, a first low friction interface between the first set of rails and the second set of rails, and a second low friction interface between the second set of rails and the carriage.

In a further aspect, the present disclosure may provide for a method for processing boards comprising: placing a board between a first set of rails extending in a transverse manner, at least one rail having a guide, orienting a second set of rails on top of and perpendicular to the first set, said second set of rails extending in a longitudinal manner, at least one rail having a guide, wherein there is a first low friction interface between the first set of rails and the second set of rails, attaching a power tool to a carriage coupled to the second set of rails, wherein there is a second low friction interface between the second set of rails and the carriage, contacting the board with an implement connected to the power tool, altering the board by manually and physically moving the carriage longitudinally along the second set of rails via the second low friction interface allowing the implement to contact the board, and further altering the board physically moving the second set of rails transversely along first set of rails via the first low friction interface allowing the implement to contact the board.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

A new device and method of operation thereof is depicted in the present disclosure and throughout FIGS. 1-5. Device 10 is a new and improved apparatus that may be used to alter or flatten wide boards, as will be discussed hereafter.

Figure 1:
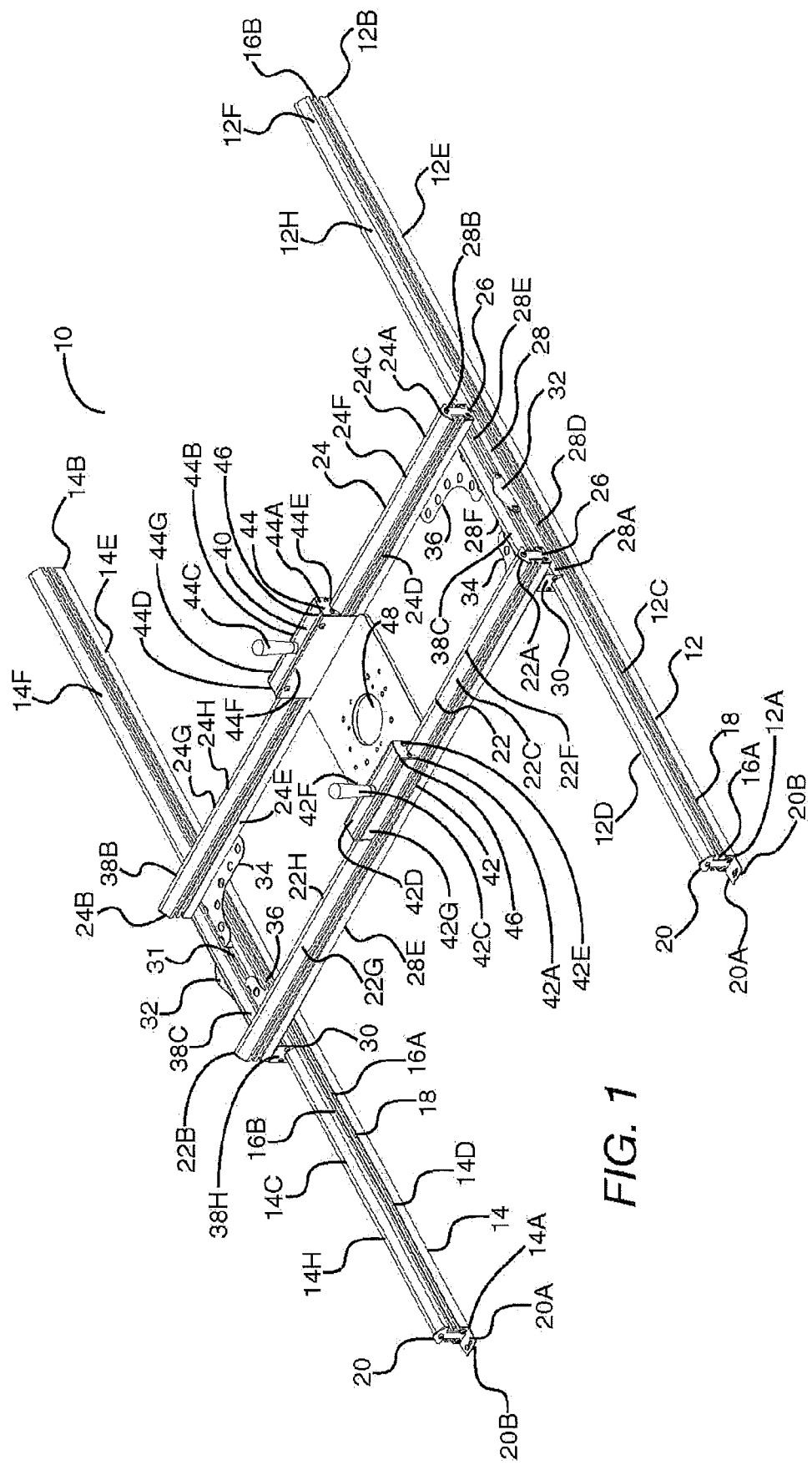
FIG. 1 is a right front perspective view of an exemplary apparatus.

Referring now to FIG. 1, a front right perspective view of an exemplary slab flattening mill device 10 is shown. The slab flattening mill device 10 has a first rail system including a first set of rails, 12, 14. The first set of rails 12, 14 extend in a transverse manner and are defined by a first end 12A, 14A and a second end 12B, 14B, respectively. In one particular embodiment, the first set of rails 12, 14 run parallel to one another.

Each rail also respectively contains an outer side 12C, 14C, an inner side second side 12D, 14D. The outer sides 12C, 14C and inner sides 12D, 14D are identical to one another. Each of the outer sides 12C, 14C and inner sides 12D, 14D contain a pair of substantially rectangular cubic shaped tracks 16A, 16B separated by a T-shaped member 18 in between. The pair of tracks 16A, 16B are engagable by various connectors to allow them to be in in rigid contract with the rails 12, 14.

Further, each rail 12, 14 respectively contains a bottom side 12E, 14E, that is relatively flat and a top side 12F, 14F. In alternative embodiments, the bottom may be grooved or have other projections and recesses as may be desired by an end user. At the top side of each rail 12F, 14F there is an inverted V-shaped guide channel 12G, 14G at its apex 12H, 14H that extends along the length of each rail which will be explained later with respect to the rails and engagement of other further exemplary rails. At each first end 12A, 14A and second end 12B, 14B, there may be a bracket 20 located there. The bracket 20 is operative to connect to the first end 12A, 14A or second end 12B, 14B and have a slot or other aperture 20A within it. The slot or other aperture 20A may have a screw 20B or other similarly situated fastening device. The screw or other similarly situated fastening device 20B may be adapted to attach to a surface that the rails 12, 14 may be attached to in order to secure them to said surface.

With continued reference to FIG. 1, the slab flattening mill device 10 has a second rail system including a second set of rails, 22, 24. The second set of rails 22, 24 extend in a longitudinal manner and are defined by a first end 22A, 24A, and a second end 22B, 24B. The second set of rails 22, 24 run parallel to one another and perpendicular to the first set of rails 12, 14.

Each rail in the second set also respectively contains an outer side or first side 22C, 24C, an inner side or second side 22D, 24D. The outer sides 22C, 24C and inner sides 22D, 24D are identical to one another. Each of the outer sides 22C, 24C and inner sides 22D, 24D contain a pair of substantially rectangular cubic shaped tracks 16A, 16B identical to those in the first set of rails 12, 14 separated by the same T-shaped member 18 in between the cubic shaped tracks 16A, 16B. Like in the first set of rails 12, 14 the pair of tracks 16A, 16B are engagable by various connectors to allow them to be in in rigid contract with the rails 22, 24. Further, each rail 22, 24 respectively contains a bottom side 22E, 24E, that is relatively flat and a top side 22F, 24F. In alternative embodiments, the bottom may be grooved or have other projections and recesses as may be desired by an end user. At the top side of each rail 22F, 24F there is an inverted V-shaped guide channel 22G, 24G at its apex 22H, 24H that extends along the length of each rail. At each first end 22A, 24A and second end 22B, 24B, there may be an end cap 26 located. The end cap 26 is operative to cover its respective end 22A, 24A, 22B, 24B as well as prevent movement as will be described later.

Additionally, there is located a first slide member 28 which abuts below transversely between the first ends of the second set of rails, 22A, 24A. The slide member is so named as to delineate it from the rails 22, 24 themselves. The first slide member 28 has a first end 28A, a second end 28B and a lateral distance defined therebetween. Additionally, the slide member is defined by its top 28C, bottom 28D, outer side 28E and inner side 28F. The first end 28A and second end 28B may both have a cover 30 located on their face and attached to the first end and second end by a screw, rivet, adhesive or otherwise engagable device. The top 28C of the first slide member 28 may define apertures and a generally planar surface. The bottom 28D may be generally a V-shape. In reality, the shape on of exemplary bottom 28D may be any shape that is complementary to the shape of the top sides 12F, 14F, of the first rail system. The bottom 28D may contain friction reducing compounds or define all of a portion of a low friction interface operative to allow the slide member to slide along the apexes 12H, 14H. These compounds may include, but are not limited to, ultra-high molecular weight (UHMW) polyethylene tape, polytetra-flouoroethylene (PTFE) tape, or other films, extruded films, skived film or foam type coatings. As used herein, friction reducing compounds and low friction interface refers to surfaces or components having static and/or kinetic a coefficient of friction less than 0.2. The first side or outer side 28E, and the inner side or second side 28F are identical to one another. Each of the first and second sides 28E, 28F contain a single substantially rectangular cubic shaped track 31 located intermediate between the top 28C and bottom 28D. Similar to those described with the first set of rails 12, 14 the track 31 is engagable by various connectors to allow them to be in in rigid contract with the first slide member 28. One such contact may be a safety stop 32. Other connections may be a first support bracket 34 and a second support bracket 36.

The first slide member 28 is operative to be engagably connected to the first ends of the second set of rails 22, 24 by a rivet, screw, or otherwise attachable device. The rivet, screw, or otherwise attachable device in an exemplary embodiment may pass through an aperture within the slide member 28 defined as through the top 28C and bottom 28D and attaching to the rail 22, 24. As a result of this engagable connection, the first slide member 28 is in fixed engagement to the first ends of the second set of rails, 22A, 24A. Additionally, there is located a second slide member 38 which spans transversely between the second ends of the second set of rails, 22B, 24B. The second slide member 38 has a first end 38A, a second end 38B and a lateral distance defined therebetween. Additionally, the second short member is defined by its top 38C, bottom 38D, outer side 38E and inner side 38F. The first end 38A and second end 38B may both have a cover 30 located on their face and attached to the first end and second end by a screw, rivet, adhesive or otherwise engagable device.

The top 38C of the second slide member 38 may include apertures and a generally planar surface. The bottom 38D may be generally a V-shape. In reality, the shape on of exemplary bottom 38D may be complementary to the shape of the top sides 12F, 14F, of the first rail system. The bottom 38D may contain friction reducing compounds operative to allow the slide member to slide along the apexes 12H, 14H. These compounds may include, but are not limited to, ultra-high molecular weight (UHMW) polyethylene tape, polytetraflouoroethylene (PTFE) tape, or other films, extruded films, skived film or foam type coatings. In one embodiment, the first side or outer side 38E, and the inner side or second side 38F are identical to one another. Each of the first and second sides 38E, 38F contain a single substantially rectangular cubic shaped track 31 located intermediate between the top 38C and bottom 38D. Similar to those described with the first set of rails 12, 14 the track 31 is engagable by various connectors to allow them to be in in rigid contract with the second slide member 38. One such contact may be a further safety stop 32. Other connections may be a further first support bracket 34 and a further second support bracket 36.

The second slide member 38 is operative to be engagably connected to the first ends of the second set of rails 22, 24 by a rivet, screw, or otherwise attachable device. The rivet, screw, or otherwise attachable device in an exemplary embodiment may pass through an aperture within the second slide member 38 defined as through the top 38C and bottom 38D and attaching to the rail 22, 24. As a result of this engagable connection, the first slide member 38 is in fixed engagement to the first ends of the second set of rails, 22A, 24A. As such, the slide members 28, 38 are operative to allow the second rail system 22, 24 to move along the first rail system 12, 14 in a transverse manner.

Further shown in FIG. 1 is a carriage 40. The carriage 40 has a first carriage arm 42 on a first side of the carriage 40A and a second carriage arm 44 on a second side of the carriage 40B. Each carriage arm 42, 44 at its bottom 42A, 44A has a generally V shape. The shape on of exemplary bottom 42A, 44A may be complementary to the shape of the top sides 22F, 24F, of the second rail system. The bottom of each carriage arm 42A, 44A may contain friction reducing compounds or define all or a portion of a low friction interface operative to allow the slide member to slide along the apexes 22H, 24H. These compounds may include, but are not limited to, ultra-high molecular weight (UHMW) polyethylene tape, polytetraflouoroethylene (PTFE) tape, or other films, extruded films, skived film or foam type coatings.

One exemplary embodiment shown contains an inverted V-shaped guide channel and a complementary V-shaped guide channel for purposes of illustration. Further exemplary embodiments provide for any shape known in the art, including but not limited to, C-shaped and complementary inverted C-shaped, M (or W) shaped and complementary inverted M (or W)-shaped, N-shaped and complementary inverted N-shaped, and/or U-shaped and complementary inverted U-shaped. In further embodiments, there may not be a shape whatsoever and may instead be a low friction contact between rails and its respective engagement.

Each carriage arm 42, 44 on its top surface 428, 448, also contains a user handle 42C, 44C. The carriage arms also have a first end 420, 440 and a second end 42E, 44E. At each end of the carriage arms 420, 440, 42E, 44E there may be a cover 46 located on their respective faces and attach to the first end and second end by a screw, rivet, adhesive or otherwise engagable device.

Each carriage arm 42, 44 has an internal side 42F, 44F and an external side 42G, 44G. The internal side 42F, 44F is operative to be connected to a through-hole 48 containing member. The connection may be a screw, rivet, or otherwise attaching device. The through-hole is operative to accept a power tool such as a router. The power tool is attached to the various apertures 48A around the through-hole 48, thereby attaching the tool to the carriage 40.

Figure 2:
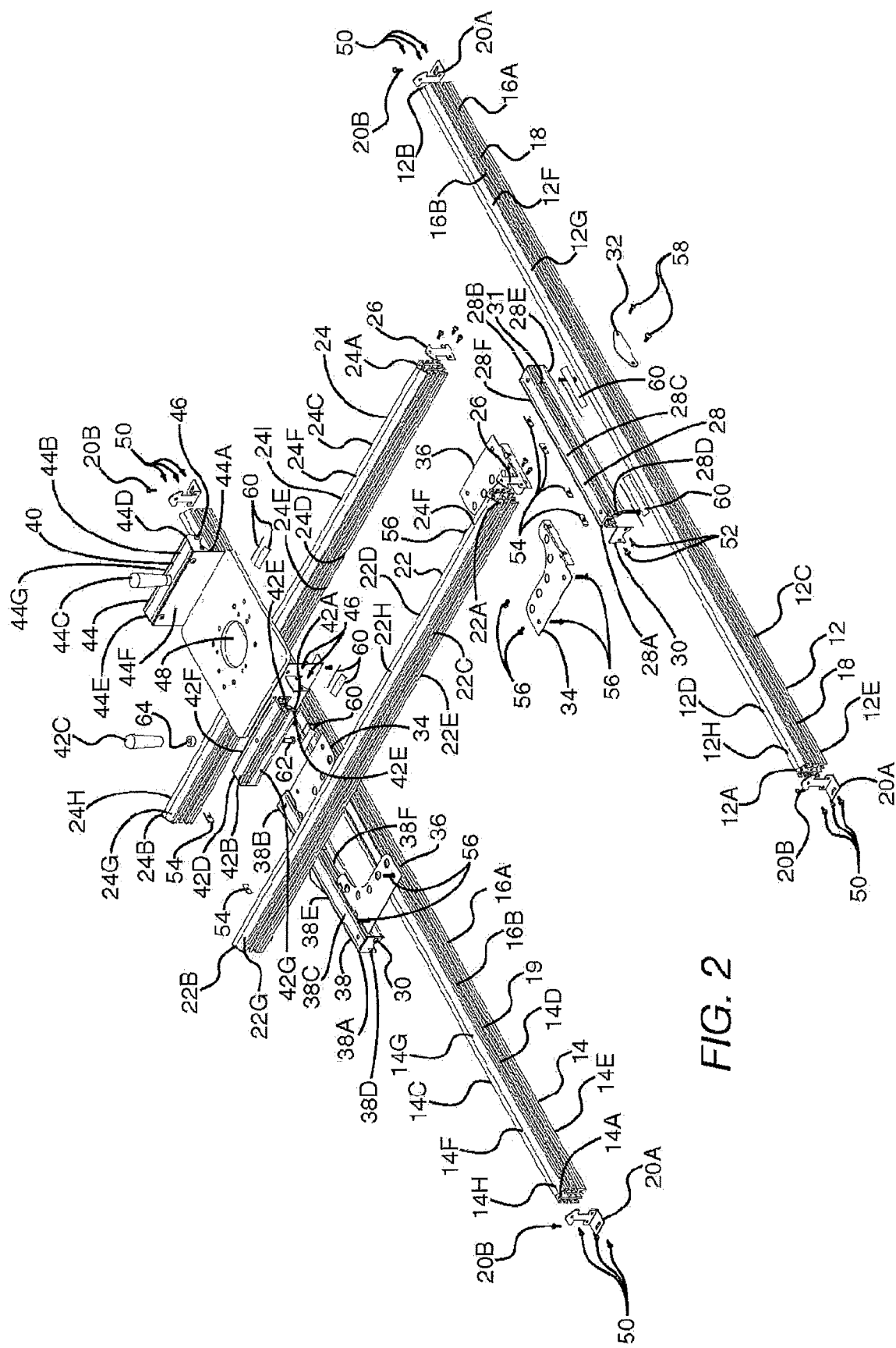
FIG. 2 is a partially exploded right front perspective view of an exemplary apparatus.

Referring now to FIG. 2, a partially exploded front right perspective view of an exemplary device is shown. As may be seen, attached to the ends of the first rail 12A, 12B and second rail 14A, 14B is attached are brackets 20. In the exemplary embodiment the brackets are attached to the rail via three screws 50 each. In alternative embodiments there may be an adhesive or rivets or other attaching means.

The second set of rails, 22, 24 are attached to the first slide member 28 and second slide member 38 at their respective bottoms 22E, 24E. In alternative embodiments these may be attached by a screw, an adhesive or rivets or other attaching means. Then, the track 31 is engaged by various eyelets 54 and screws 56 that allow the first support 34 and second support 36 to further connect the slide members 28, 38 to the set of second rails 22, 24. Further, the stop 32 is secured to the slide members 28, 38 via screws 58 and a locking nut (not shown).

Further, ultra-high molecular weight polyethylene tape 60 is shown on the bottoms of the first slide member 28D and the bottom of the first arm 42A. This can define all of or merely a portion of the low friction interface. It is similarly distributed on the second slide member 38, on the bottom 38D and on the second arm 44, on its bottom as well 44A.

Additionally, the handle on the first arm 42C is shown exploded. The handle is secured with a screw 62 and a spacer 64. The screw 62 travels from bottom 42A to top 42B passing through the spacer 64 and is in engagement with the bottom of the handle 42C. The construction of the second arm handle 44C, is similar but is not shown.

Figure 3:
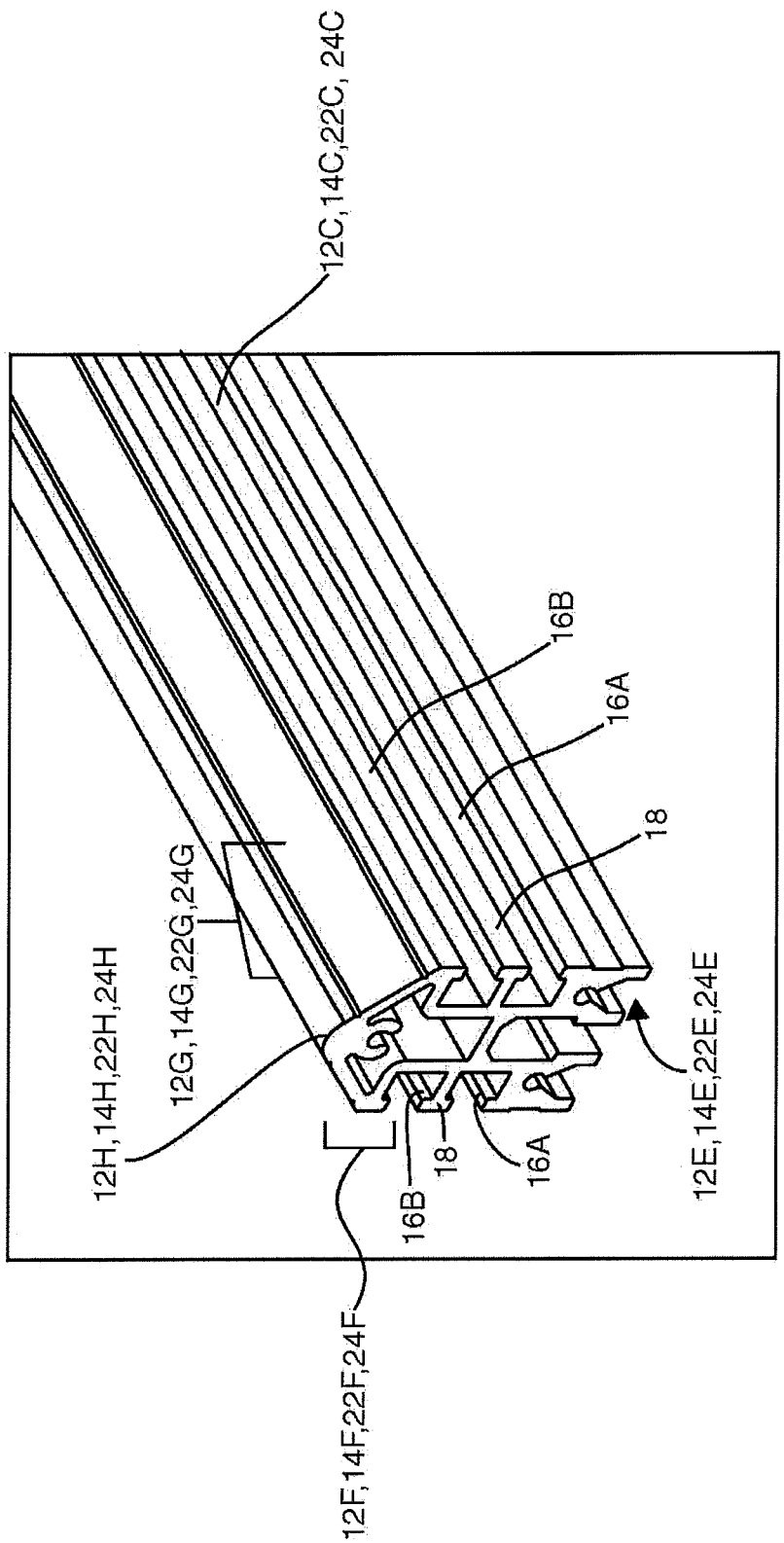
FIG. 3 is a right front perspective view of an exemplary rail.

Referring now to FIG. 3, an exemplary rail is shown. This rail is the type of rail that is used for the first rail 12, second rail 14 within the first device and the first rail 22, and second rail 24 within the second system. As shown, there pair of substantially rectangular cubic shaped tracks 16A, 16B separated by a T-shaped member in between 18.

Referring to the first rail 12, the top 12F and apex 12H of the rail is shown along with the engaging top portion 12G. The engaging top portion 12G is complementary to the bottom of both the slide members 28D, 38D as well as complementary to bottom of the first arm 42A and second arm 44A. As such, they may move across one another in slidable fashion. The outer side 12C and inner side 12D contain identical substantially rectangular cubic shaped tracks 16A, 16B separated by T-shaped members in between 18. Additionally, the triangular-like shape of the grooves in the bottom of the rails 12E is shown in this view. It should be understood that all other cross sections of rails 14, 22, 24 are identical and are not repeated piece by piece for the purposes of brevity.

Figure 4:
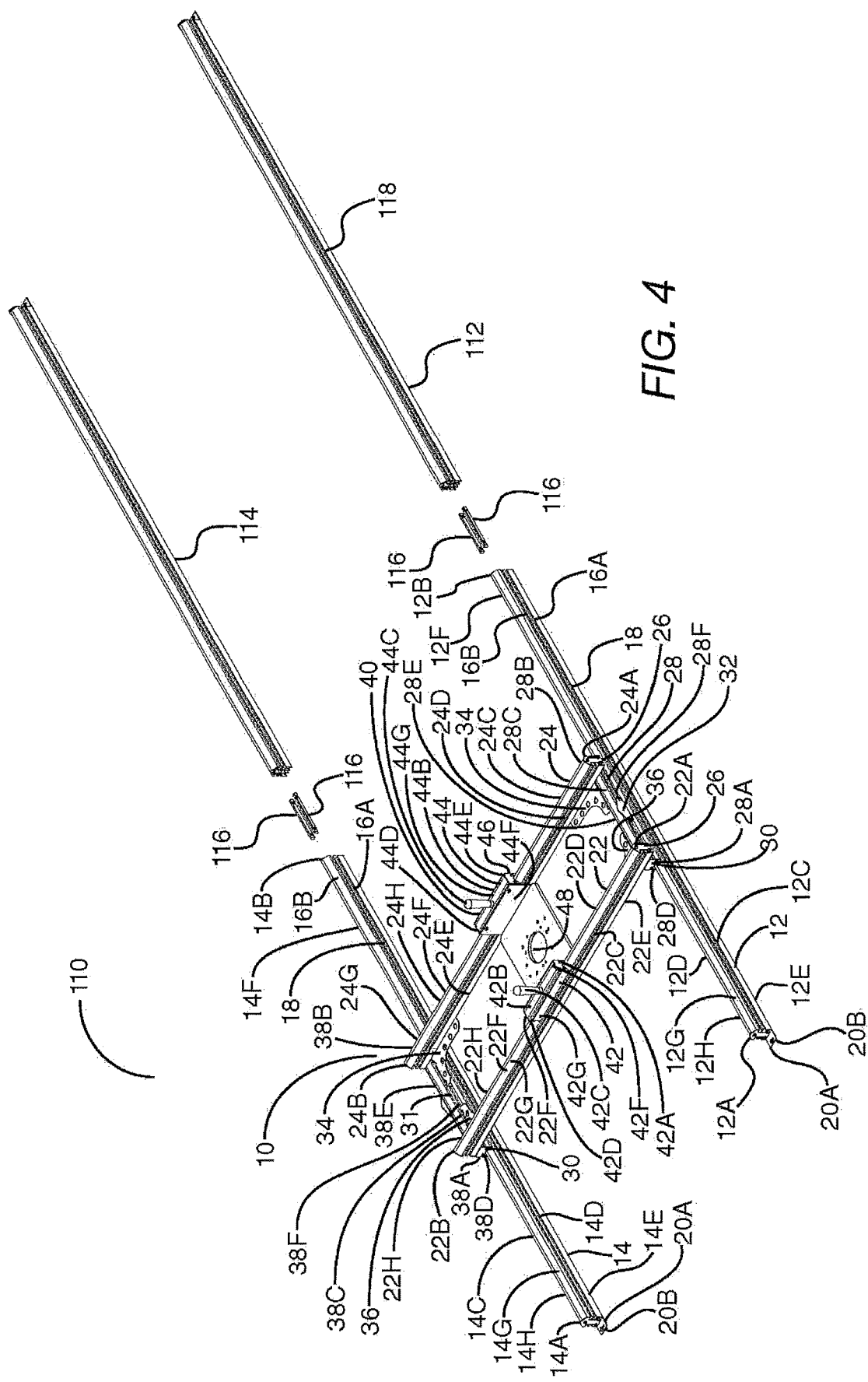
FIG. 4 is a right front perspective view of an alternative embodiment of an exemplary apparatus.

Referring now to FIG. 4, a second embodiment is shown in a front right perspective view in accordance with an aspect of the present disclosure generally indicated as 110. Device 110 differs from device 10 (shown in FIGS. 1-3) in that the device 100 has an extended first rail pair 12, 14 through the use of a further rail system 112, 114 as compared to the previous embodiment. Rail system 112, 114 extends first set of rails 12, 14 in a further transverse manner and is attached at either a first end 12A, 14A to a first end of the further rail system 112A, 114A or to a second end of the further rail system 112B, 114B, or to the second end 12B, 14B by a first end of the further rail system 112A, 114A or to a second end of the further rail system 112B, 114B when brackets 20 are removed from the first set of rails 12, 14. This attachment occurs by use of a set of spanners, 116.

Each further rail also contains an outer side 112C, 114C, an inner side second side 112D, 114D. The outer sides 112C, 114C and inner sides 12D, 14D are identical to one another. Each of the outer sides 112O, 114C and inner sides 112D, 114D contain a pair of substantially rectangular cubic shaped tracks 116A, 116B separated by a T-shaped member in between 118. The spanners 116 are slid into the substantially rectangular cubic shaped tracks on both the first set of rails 16A, 16B and the second set of rails 116A, 116B. Then, a screw or other securing device is placed through the aperture to the spanner 116C, and the first set of rails 12, 14 is then fixedly secured to the second set of rails 112, 114. In an alternative embodiment, there may be as few as one or as many as an infinite number of further rail systems, depending on the length of board desired to be milled flat or otherwise altered.

Further, each rail 112, 114 contains a bottom side 112E, 114E, that is relatively flat and a top side 112F, 114F. In alternative embodiments, the bottom may be grooved or have other projections and recesses as may be desired by an end user. At the top side of each rail 112F, 114F there is an inverted V-shaped guide channel 112G, 114G at its apex 112H, 114H that extends along the length of each rail.

At each end 12A, 14A, 112A, 114A, whichever side is not attached to the spanners, there may be a bracket 20 located at the end. As in the first embodiment, the bracket 20 is operative to connect to the ends 12A, 14A, 112A, 114A and may have a slot or other aperture 20A within it. The slot or other aperture 20A may have a screw 20B or other similarly situated fastening device. The screw or other similarly situated fastening device 20B may be adapted to attach to a surface that the rails 12, 14, 112, 114 may be attached to in order to secure them to said surface.

Having thus described an exemplary non-limiting configuration of the device 10, its operation will be discussed with reference to some exemplary features used with the device 10.

A board that is desired to be processed is placed laterally between the first set of rails 12, 14. Then, a power tool, for example, a router is attached to the various apertures 48A around the through-hole 48, thereby attaching the tool to the carriage 40. The through hole allows the operation of the power tool to make contact with the board or surface underneath with an implement of the power tool.

A user may then glide or slide the tool with the carriage 40 in a longitudinal manner by manually or physically manipulating the handles 42C, 44C on the first and second arms 42, 44. The operation of the sliding is very smooth as a result of the low friction interface effectuated by the tape 60 or other material applied to the bottom of the arms 42A, 44A allowing them to move freely about the guide 22G, 24G and apexes 22H, 24H of the second set of rails from the first end 22A, 24A to the second end 22B, 24B. The safety stops 32 attached to outer ends 28E, 38E the short slide members 28, 38 respectively prevent the carriage 40 from extending beyond the length of the rails 22 and 24.

After making as many passes in a longitudinal manner with the tool as desired, the user may then guide the tool in a transverse manner thereby moving the bottom of the first slide member 28D and second slide member 38D along the guide of the guide 12G, 14G and apexes 12H, 14H of the second set of rails from the first end 12A, 14A to the second end 12B, 14B. Similar to the bottom of the arms 42A, 44A, the low friction interface effectuated by the tape 60 or other material allows the slide members 28, 38 to glide freely about the guides 12G, 14G. The brackets 20 attached to the end of the first end 12A, 14A and second end 12B, 14B prevent the slide members 28, 38 from extending beyond the ends 12A, 12B, 14A, 14B. As such, the user may move in a transverse manner along the first set of rails 12, 14 and in a longitudinal manner along the second set of rails 22, 24 to cover every portion of the board that is desired to be processed. Therefore, is moving in a two axis plane. The two axis plane may be any of x,y; x,y; y,x; y,z; z,x; and z,y depending on the orientation of the rails.

Figure 5:
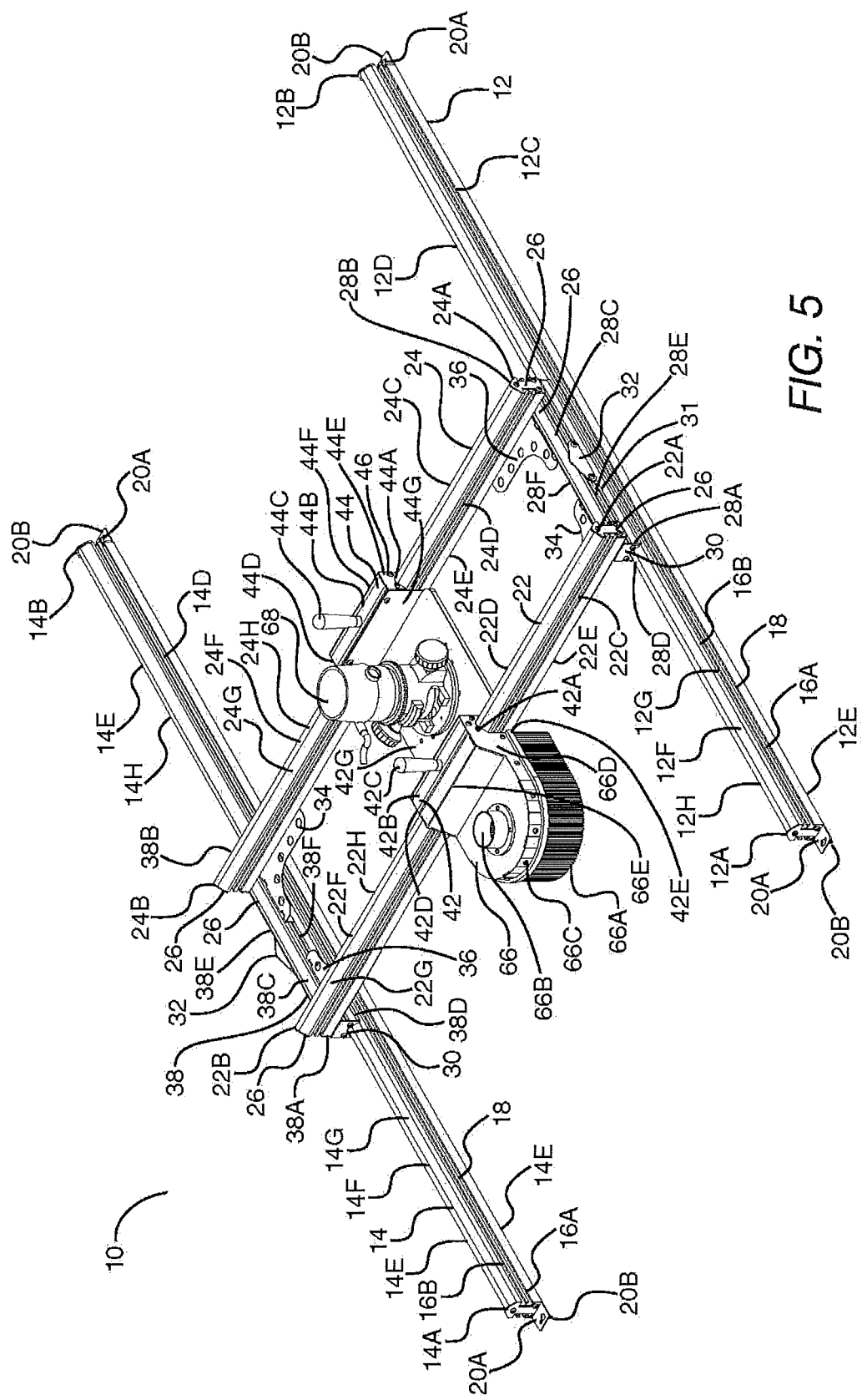
FIG. 5 is a right front perspective view of a further alternative embodiment of an exemplary apparatus.

Referring now to FIG. 5, an alternative embodiment showing a sweeper 66 and an attached tool 68 is shown. The sweeper 66 has a semi-cylindrical brush 66A and an aperture 66B which is generally cylindrical in shape. The brush 66A includes bristles operative to sweep or wisp away debris from the tool 68. The aperture 66B is adaptable to be connected to an external vacuum system. As such, the sweeper 66 is able to keep the work surface clean and free of any debris. The external vacuum system may be engaged simultaneous to working or at any time during which there is debris to clean.

The sweeper 66 has a generally abbreviated oval shape, curved in the front 66C and truncated on the back end 66D. The sweeper 66 is attached to an end 42D, 44D or 42E, 44E of the arms of the carriage 40 at its back end 66D. The sweeper 66 generally sits offset of the second set of rails 22, 24 and outside of the space between the second set of rails 22, 24, and moves as one with the carriage 40. As such, it remains between the first set of rails 12, 14 via the safety stops 32 operative to stop the carriage 40 from moving beyond the length of the second set of rails 12, 14. However, other positions are contemplated but not shown in the figures.

The sweeper 66 is operative to be attached prior to the cover 46. The cover 46 is then attached over top of the sweeper engagement. The top of the sweeper 66E is generally flat until coming to an incline to make a connection with the end 42D, 44D or 42E, 44E.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. An apparatus for altering a board comprising:
   a first set of rails having a first pair of parallel rails extending in a first direction, each rail of the first pair of parallel rails having an inverted v-shaped guide on a top surface thereof;
   a second set of rails carried by the first set of rails, the second set of rails having a second pair of parallel rails extending in a second direction that is perpendicular to the first direction, each rail of the second pair of parallel rails having a first end and a second end, and each rail of the second pair of parallel rails having an inverted v-shaped guide on a top surface thereof;
   a pair of slide members comprising a first slide member disposed at the first end of each of the second pair of parallel rails and a second slide member disposed at the second end of each of the second pair of parallel rails, wherein the first slide member and the second slide member have an inverted v-shaped channel defined in a bottom surface thereof to permit the first and second slide members to engage the inverted v-shaped guide on the top surface of the first pair of parallel rails, and wherein the first and second slide members interface between the first pair of parallel rails and the second pair of parallel rails; and
   a carriage carried by the second set of rails, wherein the carriage is adapted to retain a power tool, and the carriage comprising a first carriage arm and a second carriage arm, wherein each of the first carriage arm and the second carriage arm include a top surface and a bottom surface, wherein the bottom surface of each of the first carriage arm and the second carriage arm has an inverted v-shaped channel, wherein the inverted v-shaped channel on the first carriage arm engages the inverted v-shaped guide on the top surface of one rail of the second pair of parallel rails and the inverted v-shaped channel on the second carriage arm engages the inverted v-shaped guide on the top surface of the other rail of the second pair of parallel rails; and
   a first handle extending upward from the top surface of the first carriage arm and a second handle extending upward from the top surface of the second carriage arm, wherein the first handle and the second handle permit manual manipulation of the power tool to alter the board.

2. The apparatus of claim 1, further comprising:
   a first low friction interface between the first set of rails and the second set of rails; and a second low friction interface between the second set of rails and the first and second carriage arms.

3. The apparatus of claim 2, wherein the first low friction interface is an ultra-high molecular weight polyethylene.

4. The apparatus of claim 1, further comprising a first low friction interface and a second low friction interface, wherein each of the first low friction interface and the second low friction interface are a tape formed from one of ultra-high molecular weight (UHMW) polyethylene and polytetraflouoroethylene (PTFE) having a coefficient of friction less than 0.2.

5. The apparatus of claim 1, where the first set of rails are operative to be anchored to a surface, wherein the surface is different than that of a board being processed.

6. The apparatus of claim 1, wherein the at least one groove in each rail of the first pair of parallel rails defines a rectangular cubic shaped track; and wherein the at least one groove in each rail of the second pair of parallel rails defines a rectangular cubic shaped track.

7. The apparatus of claim 1, further comprising:
   a sweeper attached to the carriage adjacent to the power tool and the sweeper operative to sweep debris generated by altering a board, and the carriage is adapted to be engaged with a vacuum.

8. The apparatus of claim 7, wherein the sweeper further includes:
   a front end of the sweeper and a back end of the sweeper, wherein the sweeper has a substantially abbreviated oval shape with the front end of the sweeper being curved and the back end being truncated.

9. The apparatus of claim 8, wherein the sweeper further includes a semi-cylindrical brush.

10. A method for processing a piece of wood comprising:
    placing a piece of wood between a first set of rails extending in a transverse manner, at least one of the first set of rails having a guide;

orienting a second set of rails on top of and perpendicular to the first set of rails, said second set of rails extending in a longitudinal manner, at least one of the second set of rails having a guide, wherein there is a first low friction interface between the first set of rails and the second set of rails, wherein the first low friction interface is a tape formed from one of ultra-high molecular weight (UHMW) polyethylene and polytetraflouoroethylene (PTFE);

attaching a power tool to a carriage coupled to the second set of rails, wherein there is a second low friction interface between the second set of rails and the carriage and wherein the second low friction interface is a tape formed from one of UHMW polyethylene and PTFE;

contacting the piece of wood with an implement connected to the power tool;

altering the piece of wood by manually and physically moving the carriage longitudinally along the second set of rails via the second low friction interface while allowing the implement to contact the piece of wood, wherein manually and physically moving the carriage longitudinally along the second set of rails is accomplished while grasping a first handle that extends upward from a top surface of a first carriage arm and grasping a second handle that extends upward from a top surface of a second carriage arm; and further altering the piece of wood by manually and physically moving the second set of rails transversely along the first set of rails via the first low friction interface while allowing the implement to contact the piece of wood, wherein manually and physically moving the second set of rails transversely along the first set of rails is accomplished while grasping the first handle extending upward from the top surface of the first carriage arm and grasping the second handle extending upward from the top surface of the second carriage arm.

11. The method of claim 10, further comprising:
securing the first set of rails to a surface other than the piece of wood prior to attaching the power tool to the carriage.

12. The method of claim 10, further comprising:
vacuuming debris generated by altering the piece of wood with a vacuum attached adjacent to the power tool.

13. The method of claim 10, further comprising:
sweeping debris generated by altering the piece of wood with a sweeper that is connected to the carriage.

14. The method of claim 13, wherein the sweeper includes a front end of the sweeper and a back end of the sweeper, wherein the sweeper has a substantially abbreviated oval shape with the front end of the sweeper being curved and the back end being truncated.

15. The method of claim 14, wherein the sweeper further includes a semi-cylindrical brush.

16. An apparatus for altering a board comprising:

a first set of rails having a first pair of parallel rails extending in a first direction, each rail of the first pair of parallel rails having angled top surfaces that define an inverted substantially v-shaped guide;

a second set of rails carried by the first set of rails, the second set of rails having a second pair of parallel rails extending in a second direction that is perpendicular to the first direction, each rail of the second pair of parallel rails having a first end and a second end, and each rail of the second pair of parallel rails having angled top surfaces that define an inverted substantially v-shaped guide;

a pair of slide members comprising a first slide member disposed at the first end of each of the second pair of parallel rails and a second slide member disposed at the second end of each of the second pair of parallel rails, wherein the first slide member and the second slide member have angled bottom surfaces that define an inverted substantially v-shaped channel to permit the first and second slide members to engage the inverted substantially v-shaped guide on the first pair of parallel rails, and wherein the first and second slide members interface between the first pair of parallel rails and the second pair of parallel rails; and a carriage carried by the second set of rails, wherein the carriage is adapted to retain a power tool, and the carriage comprising a first carriage arm and a second carriage arm, wherein each of the first carriage arm and the second carriage arm include a top surface and angled bottom surfaces, wherein the angled bottom surfaces of each of the first carriage arm and the second carriage arm defines an inverted substantially v-shaped channel, wherein the inverted substantially v-shaped channel on the first carriage arm engages the inverted substantially v-shaped guide on one rail of the second pair of parallel rails and the inverted substantially v-shaped channel on the second carriage arm engages the inverted v-shaped guide on the other rail of the second pair of parallel rails; and a first handle extending upward from the top surface of the first carriage arm and a second handle extending upward from the top surface of the second carriage arm, wherein the first handle and the second handle permit manual manipulation of the power tool to alter the board.

\* \* \* \* \*